United States Patent [19]

Hoyt, 4th et al.

[11] 4,265,653

[45] May 5, 1981

[54] MANGANESE MICRONUTRIENT SOLUTIONS

[75] Inventors: Hazen L. Hoyt, 4th, Niantic; Daniel R. Uhr, Jr., Stonington, both of Conn.

[73] Assignee: Pfizer Inc., New York, N.Y.

[21] Appl. No.: 54,542

[22] Filed: Jul. 5, 1979

[51] Int. Cl.³ ............................................. C05C 3/00
[52] U.S. Cl. ......................................... 71/11; 71/59; 71/60; 71/61; 71/64 C
[58] Field of Search ................... 71/31, 11, 64 C, 61, 71/63, 1, 58, 60, 59, 64 SC, 64 G, DIG. 1, DIG. 2

[56] References Cited

U.S. PATENT DOCUMENTS

| | | | |
|---|---|---|---|
| 2,770,540 | 11/1956 | Vierling | 71/59 X |
| 2,813,014 | 11/1957 | Allison et al. | 71/11 |
| 2,950,183 | 8/1960 | Nikitin et al. | 71/11 |
| 3,131,048 | 4/1964 | Balassa | 71/1 |
| 3,667,928 | 6/1972 | Backlund | 71/1 X |
| 3,798,020 | 3/1974 | Parham et al. | 71/64 CX |
| 3,869,272 | 3/1975 | Windgasen | 71/64 CX |
| 4,012,220 | 3/1977 | Szalay et al. | 71/11 |

FOREIGN PATENT DOCUMENTS

| | | | |
|---|---|---|---|
| 2359077 | 3/1978 | France | 71/11 |
| 193539 | 3/1967 | U.S.S.R. | 71/61 |

OTHER PUBLICATIONS

Product Bulletin Amoco Oil Co.; "Amoco Guide to Crop-Mate Nutrients", p. 21 (1977).
NFSA Additives Handbook; 1977 Ed., National Fertilizer Solutions Assn., 1701 W. Detweiller Drive, Peoria, Ill. 61614; p. 195.

*Primary Examiner*—William F. Smith
*Assistant Examiner*—Ferris H. Lander
*Attorney, Agent, or Firm*—Francis X. Murphy; Charles J. Knuth; Peter C. Richardson

[57] ABSTRACT

An aqueous manganese micronutrient solution comprising between 0.1 and 2.0 wt. % of ferrous ion, about 5 wt. % manganous ion, between 1 and 1.5 moles of citric acid anion per mole of manganous ion and ammonia in an amount to maintain the pH of the solution between 7.5 and 12.

10 Claims, No Drawings

MANGANESE MICRONUTRIENT SOLUTIONS

BACKGROUND OF THE INVENTION

This invention relates to plant micronutrient solutions, especially to such solutions containing manganese.

In addition to treating soils for agricultural use with fertilizers containing nitrogen, phosphorus and potassium, it has become common practice to apply certain micronutrient elements essential for proper plant nutrition, including iron, zinc, manganese and copper, to correct or prevent deficiencies of such elements. Such elements are most conveniently applied in aqueous solutions either to the soil in which the plants are grown or to the plant itself as a foliar spray. However, it has been found that aqueous solutions of manganese micronutrients present certain problems in storage and application. Firstly, it is necessary that the manganese be in solution and applied to the plant as a soluble form of manganese. It is therefore important to avoid precipitation of the manganese during storage or on application. Further, it is most convenient and economical for the user to apply several fertilizer components, pesticides or other agricultural chemicals in a single operation. Accordingly, it is desirable to provide the manganese in a solution form that is compatible with other fertilizers, particularly the widely used nitrogen-phosphorus-potassium liquid fertilizers and with other agricultural chemicals. Aqueous solutions of manganese salts such as manganous sulfate form insoluble complex salts when combined with liquid nitrogen-phosphorus-potassium fertilizers and accordingly separate application of the fertilizer and manganese solution has been necessary. Efforts to provide divalent manganese solutions in a form compatible with liquid fertilizers have typically involved complexing the manganous ion with a chelating agent such as EDTA or a polyhydroxy acid. U.S. Pat. No. 3,869,272 discloses an ammoniacal aqueous solution having a pH in the range 9 to 12 and containing 3 to 8% soluble divalent manganese, at least 1 mole of citric acid per mole of manganous ion, together with about 0.1 to 5 wt. % of sodium bisulfite as an oxidation inhibitor. Other suitable antioxidants for use in such a solution are sulfites, dithionites, thiosulfates and hydroxylamines.

SUMMARY OF THE INVENTION

The present invention comprises manganese micronutrient solutions having improved storage stability over a pH range of about 7.5 to about 12 and which are compatible with nitrogen-phosphorus-potassium fertilizers. More particularly, the present invention relates to micronutrient solutions comprising (a) a soluble ferrous compound in an amount sufficient to provide between 0.1 and 2.0 wt. %, preferably 0.25 to 1.0 wt. % and most preferably about 0.5 wt. %, ferrous ion; (b) a soluble manganous compound in an amount sufficient to provide about 5 wt. % divalent manganous ion; (c) between 1.0 and 1.5, preferably 1.0 to 1.2, moles of citric acid anion per mole of manganous ion; (d) ammonia in an amount to maintain the solution at a pH between 7.5 and 12, preferably 8.5 to 10; and (e) water.

The ferrous compound is preferably selected from ferrous sulfate and ferrous chloride, most preferably ferrous sulfate. The manganous compound is preferably selected from manganous sulfate, manganous chloride, manganous nitrate and manganous oxide, most preferably manganous sulfate. While compositions containing about 5 wt. % manganous ion are preferred, manganous ion concentrations between about 4 and 6 wt % may be employed in the present invention.

A particularly preferred micronutrient solution of this invention contains about 0.5 wt. % ferrous ion, about 5 wt. % manganous ion, 1.0 moles of citric acid anion per mole of manganous ion and sufficient ammonia to maintain the pH at about 9.7, especially such solutions where the ferrous and manganous ions are derived from ferrous and manganous sulfates respectively.

DETAILED DESCRIPTION OF THE INVENTION

The manganese micronutrient solutions of this invention having compositions as described hereinabove are readily prepared by adding the desired amounts of the constituent elements to water. Thus, appropriate amounts of ferrous and manganous compounds may be added successively to a solution containing an appropriate amount of citric acid, the solution being stirred during addition of the metal compounds to aid in dissolution of the salts. Ammonia, preferably as a solution of ammonium hydroxide containing 28% ammonia, is then added to the solution to adjust the pH to the desired value in the range 7.5 to 12, preferably while cooling the solution to avoid excessive heat generation. The citric acid anion is preferably added to the solution in the form of citric acid, but may be derived from an appropriate citrate, especially ammonium citrate. Suitable ferrous compounds for use in this invention include the salts of mineral acids, such as ferrous sulfate and ferrous chloride, ferrous sulfate being a preferred salt for preparation of the present compositions. Similarly, suitable manganese compounds include manganous sulfate, manganous nitrate, manganous chloride and manganous oxide, with manganous sulfate being preferred.

The manganese micronutrient solutions containing between 0.1 and 2.0 weight percent ferrous ion in compositions as described above have been found to have particularly good storage stability and avoid the formation of insoluble precipitates and consequent loss of divalent manganese in solution during such storage periods. Additionally, the use of ferrous salts in manganese micronutrient solutions provides storage stability over a wider range of pH, particularly at values less than about 9. This is advantageous for providing suitable solutions for use as foliar sprays, where it is desirable to apply a solution having a pH which is close to neutral. The compositions are also compatible with liquid, nitrogen-phosphorus-potassium fertilizers and do not form insoluble precipitates on mixing with such liquid fertilizers for application to the soil or to plants. Generally, the manganese micronutrient solution will be mixed with the liquid nitrogen-phosphorus-potassium fertilizer at the time of application to the plants and the combined micronutrient-fertilizer will be used without any further substantial storage period.

The micronutrient solutions of this invention are applied to the soil or to growing plants in accord with conventional techniques well known in the art. The present solutions provide suitable concentrates which will generally be diluted before use to provide a solution having the desired level of manganese for application depending on the condition of the particular soil and the particular crop to be treated, in accord with standard agricultural practice. In general, the manganese content of the solutions will be such as to provide the equivalent of between about 15 to 50 lbs. of elemental manganese per acre, although variations will occur depending on the specific soils and crops to be treated. The solutions may be applied to the soil either alone or in combination with for example, liquid fertilizers, other micronutrients, pesticides, herbicides and other conventional chemicals or additives. Similarly, when applied as a foliar spray to the crops to be treated other conventional additives such as wetting agents, pesticides, and the like may be combined with the manganese micronutrient solution. It will also be recognized that the ferrous ion content of the present compositions will not only impart improved storage stability to the manganese concentrate stock solution but will also provide at least a part of the iron necessary for plant nutrition.

The present invention is illustrated by the following examples. However, the invention is not limited to the specific details of these examples.

EXAMPLE 1

A manganese micronutrient solution containing 0.5 wt. % ferrous ion, 5 wt. % manganous ion, a 1:1 citric acid to manganous ion mole ratio and having a pH of 9.7 was prepared by dissolving 2.5 parts of ferrous sulfate ($FeSO_4.7H_2O$) and 15.4 parts of manganous sulfate ($MnSO_4.H_2O$) in a solution of 17.5 part of anhydrous citric acid in 29.1 parts water, followed by the addition of 35.5 parts of ammonium hydroxide solution (28% ammonia).

EXAMPLE 2

Manganese micronutrient solutions containing 0.1 wt. % ferrous ion and 2.0 wt. % ferrous ion, but otherwise of the same composition as the solution of Example 1, were prepared from the following materials:

|  | 0.1 wt. % $Fe^{2+}$ | 2.0 wt. % $Fe^{2+}$ |
|---|---|---|
| Water | 32.0 parts | 16.0 parts |
| Citric Acid anhydrous | 17.5 parts | 17.5 parts |
| $FeSO_4.7H_2O$ | 0.5 parts | 10.0 parts |
| $MnSO_4.H_2O$ | 15.4 parts | 15.4 parts |
| $NH_4OH$ | OH 34.6 parts | 41.4 parts |

EXAMPLE 3

A manganese micronutrient solution containing 0.5 wt. % ferrous ion, 5 wt. % manganous ion, a 1.5:1 citric acid to manganous ion mole ratio and having a pH of 9.7 was prepared as described in Example 1 from 10.9 parts water, 26.2 parts citric acid, 2.5 parts ferrous sulfate heptahydrate, 15.4 parts of manganous sulfate monohydrate and 45.0 parts of ammonium hydroxide (28% $NH_3$).

EXAMPLE 4

A manganese micronutrient solution of the composition of Example 1 but having a pH of 7.5 was prepared as described in Example 1 from 40.4 parts of water, 17.4 parts of citric acid, 2.5 parts of ferrous sulfate heptahydrate, 15.4 parts of manganous sulfate monohydrate and 24.3 parts of ammonium hydroxide (28% $NH_3$).

A solution of the same composition having a pH of 8.5 was prepared as described in Example 1 from 39.9 parts of water, 17.4 parts of citric acid, 2.5 parts of ferrous sulfate heptahydrate, 15.4 parts of manganous sulfate monohydrate and 24.8 parts of ammonium hydroxide (28% $NH_3$).

We claim:

1. An aqueous plant nutrient solution consisting essentially of (a) a soluble ferrous compound in an amount sufficient to provide between 0.1 and 2.0 wt. % ferrous ion; (b) a soluble manganous compound in an amount sufficient to provide about 5 wt. % of manganous ion; (c) between 1 and 1.5 moles of citric acid anion per mole of manganous ion; and (d) ammonia in an amount sufficient to maintain said solution at a pH between 7.5 and 12.

2. A solution according to claim 1 containing from 0.25 to 1 wt. % ferrous ion.

3. A solution according to claim 1 containing about 0.5 wt. % ferrous ion.

4. A solution according to claim 1 wherein said pH is from 8.5 to 10.

5. A solution according to claim 1 containing from 1 to 1.2 moles of citric acid anion per mole of manganous ion.

6. A solution according to claim 1 wherein said ferrous compound is selected from the group consisting of ferrous sulfate and ferrous chloride.

7. A solution according to claim 1 wherein said manganous compound is selected from the group consisting of manganous sulfate, manganous chloride, manganous nitrate and manganous oxide.

8. A solution according to claim 1 containing 0.5 wt. % ferrous ion, 1.0 mole of citric acid anion per mole of manganous ion and having a pH of about 9.7.

9. A solution according to claim 8 wherein said ferrous compound is ferrous sulfate.

10. A solution according to claim 9 wherein said manganous compound is manganous sulfate.

* * * * *